US009537354B2

(12) United States Patent
Bell et al.

(10) Patent No.: US 9,537,354 B2
(45) Date of Patent: Jan. 3, 2017

(54) SYSTEM AND METHOD FOR SMART REGISTRATION OF WIRELESS POWER RECEIVERS IN A WIRELESS POWER NETWORK

(71) Applicant: ENERGOUS CORPORATION, Pleasanton, CA (US)

(72) Inventors: Douglas Bell, Pleasanton, CA (US); Michael A. Leabman, San Ramon, CA (US)

(73) Assignee: Energous Corporation, San Jose, CA (US)

(*) Notice: Subject to any disclaimer, the term of this patent is extended or adjusted under 35 U.S.C. 154(b) by 0 days.

(21) Appl. No.: 14/336,987

(22) Filed: Jul. 21, 2014

(65) Prior Publication Data
US 2016/0020649 A1 Jan. 21, 2016

(51) Int. Cl.
H01F 38/00 (2006.01)
H02J 17/00 (2006.01)
H04W 12/08 (2009.01)
H04W 84/12 (2009.01)

(52) U.S. Cl.
CPC ............. H02J 17/00 (2013.01); H04W 12/08 (2013.01); H04W 84/12 (2013.01); Y04S 40/24 (2013.01)

(58) Field of Classification Search
USPC ........................................................ 307/104
See application file for complete search history.

(56) References Cited
U.S. PATENT DOCUMENTS 4,360,741 A 11/1982 Fitzsimmons et al.
5,712,642 A 1/1998 Hulderman
(Continued)

FOREIGN PATENT DOCUMENTS

EP 2545635 A2 1/2013
KR 1020130026977 A 3/2013
(Continued)

OTHER PUBLICATIONS

International Search Report dated Jan. 27, 2015 corresponding to International Patent Application No. PCT/US2014/037170, 4 pages.
(Continued)

Primary Examiner — Rexford Barnie
Assistant Examiner — Dru Parries
(74) Attorney, Agent, or Firm — Eric L. Sophir; Dentons US LLP

(57) ABSTRACT

A system and method for smart registration of wireless power receivers within a wireless power network is disclosed. Each wireless power device may include a universally unique identifier (UUID). Each wireless power device bought by a customer may be registered, at the time of purchase or later. The registry may be stored in an energy domain service, where energy domain service may be one or more cloud-based servers. The method for smart registration may include the steps of detecting a customer device; establishing a connection with a wireless power receiver to read its UUID; sending wireless power transmitter manager's UUID and wireless power receiver's UUID to energy domain service; inspecting wireless power transmitter manager registry; verifying wireless power receiver registry; authorizing power transfer to wireless power receiver; and reporting energy consumption for subsequent billing of customer depending on billing policy of wireless power transmitter manager specified within registry.

20 Claims, 3 Drawing Sheets

(56) References Cited

U.S. PATENT DOCUMENTS

| | | | |
|---|---|---|---|
| 5,936,527 A | 8/1999 | Isaacman et al. |
| 5,982,139 A | 11/1999 | Parise |
| 6,127,799 A | 10/2000 | Krishnan |
| 6,127,942 A | 10/2000 | Welle |
| 6,289,237 B1 | 9/2001 | Mickle et al. |
| 6,615,074 B2 | 9/2003 | Mickle et al. |
| 6,798,716 B1 | 9/2004 | Charych |
| 6,856,291 B2 | 2/2005 | Mickle et al. |
| 6,960,968 B2 | 11/2005 | Odendaal et al. |
| 7,003,350 B2 | 2/2006 | Denker et al. |
| 7,027,311 B2 | 4/2006 | Vanderelli et al. |
| 7,068,991 B2 | 6/2006 | Parise |
| 7,191,013 B1 | 3/2007 | Miranda et al. |
| 7,403,803 B2 | 7/2008 | Mickle et al. |
| 7,451,839 B2 | 11/2008 | Perlman |
| 7,639,994 B2 | 12/2009 | Greene et al. |
| 7,643,312 B2 | 1/2010 | Vanderelli et al. |
| 7,786,419 B2 | 8/2010 | Hyde et al. |
| 7,812,771 B2 | 10/2010 | Greene et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,925,308 B2 | 4/2011 | Greene et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,362,745 B2 | 1/2013 | Tinaphong |
| 8,380,255 B2 | 2/2013 | Shearer et al. |
| 8,410,953 B2 | 4/2013 | Zeine |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,461,817 B2 | 6/2013 | Martin et al. |
| 8,552,597 B2 | 10/2013 | Song et al. |
| 8,558,661 B2 | 10/2013 | Zeine |
| 8,621,245 B2 | 12/2013 | Shearer et al. |
| 8,854,176 B2 | 10/2014 | Zeine |
| 8,897,770 B1 | 11/2014 | Frolov et al. |
| 9,000,616 B2 | 4/2015 | Greene et al. |
| 9,021,277 B2 | 4/2015 | Shearer et al. |
| 2003/0179573 A1 | 9/2003 | Chun |
| 2005/0007276 A1 | 1/2005 | Barrick et al. |
| 2006/0238365 A1 | 10/2006 | Vecchione et al. |
| 2006/0284593 A1 | 12/2006 | Nagy et al. |
| 2007/0007821 A1 | 1/2007 | Rossetti |
| 2007/0060185 A1 | 3/2007 | Simon et al. |
| 2007/0178945 A1 | 8/2007 | Cook et al. |
| 2007/0191075 A1 | 8/2007 | Greene et al. |
| 2008/0122297 A1 | 5/2008 | Arai |
| 2008/0309452 A1 | 12/2008 | Zeine |
| 2009/0067208 A1 | 3/2009 | Martin et al. |
| 2009/0200985 A1 | 8/2009 | Zane et al. |
| 2009/0243397 A1 | 10/2009 | Cook et al. |
| 2010/0027379 A1 | 2/2010 | Saulnier et al. |
| 2010/0033021 A1 | 2/2010 | Bennett |
| 2010/0194206 A1 | 8/2010 | Burdo et al. |
| 2010/0201201 A1 | 8/2010 | Mobarhan et al. |
| 2010/0244576 A1 | 9/2010 | Hillan et al. |
| 2010/0277003 A1 | 11/2010 | Von Novak et al. |
| 2010/0295372 A1 | 11/2010 | Hyde et al. |
| 2010/0309079 A1 | 12/2010 | Rofougaran et al. |
| 2010/0315045 A1 | 12/2010 | Zeine |
| 2011/0074342 A1 | 3/2011 | MacLaughlin |
| 2011/0115303 A1 | 5/2011 | Baarman et al. |
| 2011/0181120 A1 | 7/2011 | Liu et al. |
| 2011/0199046 A1 | 8/2011 | Tsai et al. |
| 2011/0254503 A1 | 10/2011 | Widmer et al. |
| 2011/0278941 A1 | 11/2011 | Krishna et al. |
| 2011/0281535 A1 | 11/2011 | Low et al. |
| 2011/0282415 A1 | 11/2011 | Eckhoff et al. |
| 2012/0080957 A1 | 4/2012 | Cooper et al. |
| 2012/0146576 A1 | 6/2012 | Partovi |
| 2012/0157019 A1 | 6/2012 | Li |
| 2012/0193999 A1 | 8/2012 | Zeine |
| 2012/0248891 A1 | 10/2012 | Drennen |
| 2012/0274154 A1 | 11/2012 | DeLuca |
| 2012/0293021 A1 | 11/2012 | Teggatz et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0326660 A1 | 12/2012 | Lu et al. |
| 2013/0024059 A1 | 1/2013 | Miller et al. |
| 2013/0026982 A1 | 1/2013 | Rothenbaum |
| 2013/0207604 A1 | 8/2013 | Zeine |
| 2013/0241468 A1 | 9/2013 | Moshfeghi |
| 2013/0241474 A1 | 9/2013 | Moshfeghi |
| 2014/0008992 A1 | 1/2014 | Leabman |
| 2014/0008993 A1 | 1/2014 | Leabman |
| 2014/0035524 A1 | 2/2014 | Zeine |
| 2014/0049422 A1 | 2/2014 | Von Novak et al. |
| 2014/0062395 A1 | 3/2014 | Kwon et al. |
| 2014/0194092 A1 | 7/2014 | Wanstedt et al. |
| 2014/0217967 A1 | 8/2014 | Zeine et al. |
| 2014/0241231 A1 | 8/2014 | Zeine |
| 2014/0265725 A1 | 9/2014 | Angle et al. |
| 2014/0265727 A1 | 9/2014 | Berte |
| 2014/0265943 A1 | 9/2014 | Angle et al. |
| 2014/0281655 A1 | 9/2014 | Angle et al. |
| 2014/0354063 A1 | 12/2014 | Leabman et al. |
| 2014/0354221 A1 | 12/2014 | Leabman et al. |
| 2014/0357309 A1 | 12/2014 | Leabman et al. |
| 2014/0368048 A1 | 12/2014 | Leabman et al. |
| 2014/0375255 A1 | 12/2014 | Leabman et al. |
| 2015/0015194 A1 | 1/2015 | Leabman et al. |
| 2015/0015195 A1 | 1/2015 | Leabman et al. |
| 2015/0022010 A1 | 1/2015 | Leabman et al. |
| 2015/0102681 A1 | 4/2015 | Leabman et al. |
| 2015/0102769 A1 | 4/2015 | Leabman et al. |
| 2015/0130285 A1 | 5/2015 | Leabman et al. |
| 2015/0199665 A1 | 7/2015 | Chu |

FOREIGN PATENT DOCUMENTS

| | | |
|---|---|---|
| WO | 9952173 A2 | 10/1999 |
| WO | 03091943 A1 | 11/2003 |
| WO | 2004077550 A1 | 9/2004 |
| WO | 2008156571 A2 | 12/2008 |
| WO | 2010022181 A1 | 2/2010 |
| WO | 2011112022 A2 | 9/2011 |
| WO | 2013035190 A1 | 3/2013 |

OTHER PUBLICATIONS

International Search Report dated Oct. 16, 2014 corresponding to International Patent Application No. PCT/US2014/041546, 4 pages.
International Search Report dated Oct. 13, 2014 corresponding to International Patent Application No. PCT/US2014/041534, 4 pages.
International Search Report dated Nov. 12, 2014 corresponding to International Patent Application No. PCT/US2014/046956, 4 pages.
Written Opinion of the International Searching Authority dated Nov. 12, 2014 corresponding to International Patent Application No. PCT/US2014/046956, 6 pages.
International Search Report dated Sep. 12, 2014 corresponding to International Patent Application No. PCT/US2014/037072, 3 pages.
International Search Report and Written Opinion of the International Searching Authority, mailed Jul. 5, 2016 in International Application No. PCT/US2015/067282, 7 pages.

SYSTEM AND METHOD FOR SMART REGISTRATION OF WIRELESS POWER RECEIVERS IN A WIRELESS POWER NETWORK

CROSS-REFERENCE TO RELATED APPLICATIONS

The present disclosure is related to U.S. non-provisional patent application Ser. No. 13/891,430, filed May 10, 2013, entitled "Methodology for Pocket-forming"; and application Ser. No. 13/925,469, filed Jun. 24, 2013, entitled "Methodology for Multiple Pocket-Forming"; application Ser. No. 13/946,082, filed Jul. 19, 2013, entitled "Method for 3 Dimensional Pocket-forming"; application Ser. No. 13/891,399, filed May 10, 2013, entitled "Receivers for Wireless Power Transmission"; application Ser. No. 13/891,445, filed May 10, 2013, entitled "Transmitters for Wireless Power Transmission" invented by Michael Leabman, each of which are incorporated by reference in their entirety herein.

BACKGROUND

Field of the Disclosure

The present disclosure relates in general to wireless power transmission, and more specifically to systems and methods for smart registration of wireless power receivers within a wireless power network.

Background Information

Electronic devices such as laptop computers, smart-phones, portable gaming devices, tablets, and so forth may need power for performing their intended functions. This may require having to charge electronic equipment at least once a day, or in high-demand electronic devices more than once a day. Such an activity may be tedious and may represent a burden to users. For example, a user may be required to carry chargers in case his electronic equipment is lacking power. In addition, users may have to find available power sources to connect to. Lastly, users must plugin to an electric outlet or other power supply to be able to charge his or her electronic device. However, such an activity may render electronic devices inoperable during charging. Current solutions to this problem may include inductive pads which may employ magnetic induction or resonating coils. Nevertheless, such a solution may still require that electronic devices may have to be placed in a specific place for powering. Thus, electronic devices during charging may not be portable.

Other solutions to this problem may include using controlled Radio RF waves which may converge in 3-D space for charging or powering electronic devices. This option may provide wireless power using one or more wireless power transmitters and one or more wireless power receivers, while eliminating the use of wires or pads for charging devices.

The ability to charge electronic devices wirelessly has great benefits. However, it may be necessary to manage the access of users to the network to prevent the abuse of the system resources. For example if many devices are connected to a wireless power network, different failures can affect the network, therefore interrupting the power transfer. Failures may include a loss of power, a failure in the hardware or software of a wireless power transmitter manager, overload of the wireless power transmitter manager, and malfunctioning in a wireless power transmitter manager, among others.

For the foregoing reasons, there is a need for a system and method that may allow the smart registration of wireless power receivers within a wireless power network so as to prevent the abuse of the system resources which may eventually result in a breakdown of the system.

SUMMARY

The present disclosure provides a system and method for smart registration of wireless power receivers within a wireless power network.

In one embodiment, a wireless power network may include one or more wireless power transmitter managers and/or one or more wireless power receivers for powering various customer devices. Each wireless power device may include a universally unique identifier (UUID).

In a different aspect of this embodiment, a wireless power receiver may be paired with a customer device. In another embodiment, the wireless power receiver may be built-in to the customer device.

In another aspect of this embodiment, each wireless power transmitter manager in the wireless power network may receive customer device's signal strength from advertisement emitted by the wireless power receiver and customer device's graphical user interface (GUI). Graphical user interface (GUI) may be part of wireless power system software downloaded and installed from public application store. Also wireless power transmitter manager may send power in a range up to 30 feet.

According to some aspects of this embodiment, wireless power transmitter manager may include a device database, where device database may store information about all network devices such as unique device identification (ID), serial number, signal strength, identification of paired partner device, customer device's power schedules and manual overrides; customer device's past and present operational status, battery level and charge status, hardware value measurements, faults, errors, and significant events; names, customer's authentication or authorization names, and configuration details running the system, among others.

In a different aspect of this embodiment, each wireless power device bought by a customer may be registered at the time of purchase, or registered later by the customer using public accessible web page or smart device application that communicates to an energy domain service.

Energy domain service may be one or more cloud-based servers and each cloud-based servers may include a database that may store a registry for each wireless power device purchased by a customer. In a different aspect of this embodiment, energy domain service may be hosted in an internet accessible cloud.

In another embodiment, a method for smart registration of wireless power receivers within a wireless power network may include the steps of a wireless power transmitter manager detecting a customer device; establishing a connection with a wireless power receiver to read its UUID; sending wireless power transmitter manager's UUID and wireless power receiver's UUID to an energy domain service for authentication and authorization to transmit power to customer device; inspecting wireless power transmitter manager registry; verifying wireless power receiver registry; authorizing the wireless power transmitter manager to send power to wireless power receiver; and reporting energy consumption statistics to energy domain service for subsequent billing of customer depending on billing policy of wireless power transmitter manager specified within registry.

According to some aspect of this embodiment, a customer may be able to select through a GUI device, which wireless power receivers may receive charge from customer's wireless power transmitter manager.

In another embodiment, the customer may be provided with a pre-authorized wireless power receiver at commercial point of sale by proprietor or clerk. The wireless power receiver may be attached to customer's device, subsequently proprietor may register customer's billing information, such as credit card, Pay Pal account, or a different payment method, immediately the local wireless power system may start sending power to the customer device that is attached to pre-authorized wireless power receiver. The local wireless power system may report energy consumption statistics to energy domain service for subsequent billing of customer.

The system and method for smart registration of wireless power receivers within a wireless power network described here may allow a network manager to manage the access of users to the network, preventing the abuse of system resources which may eventually result in a breakdown of the system. Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
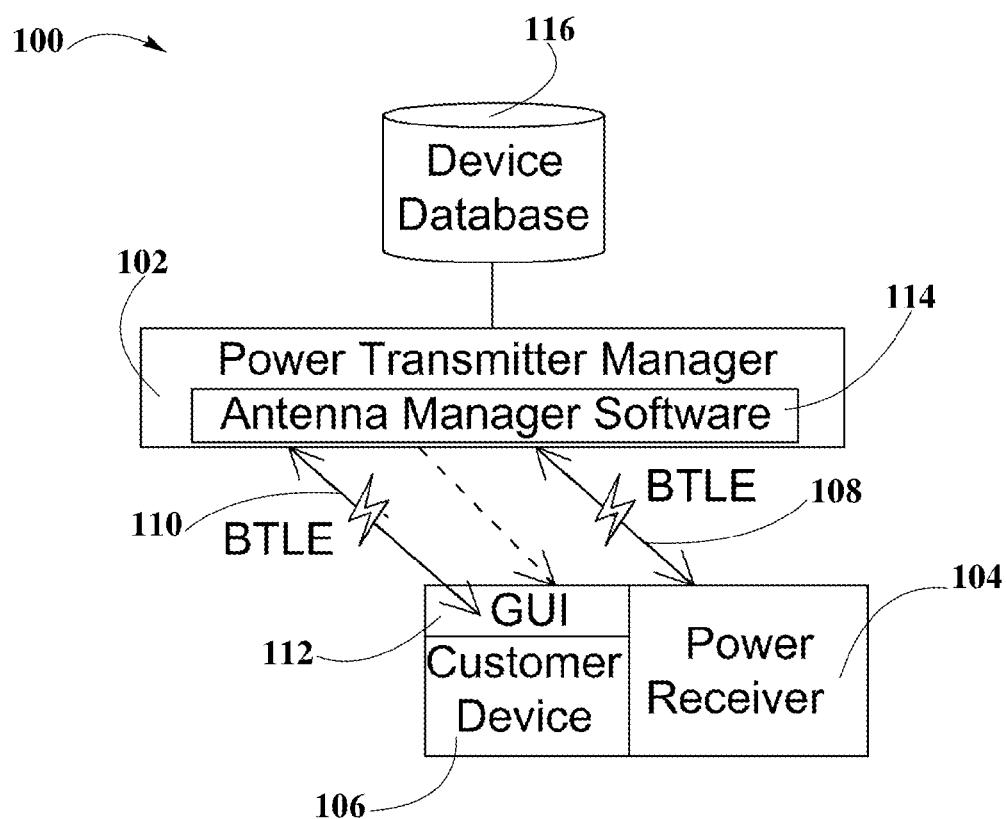
FIG. 1 shows a wireless power system using a wireless power transmitter manager, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

DEFINITIONS

As used here, the following terms may have the following definitions:

"Transmitter" refers to a device including a chip which may generate two or more RF signals, at least one RF signal being phase shifted and gain adjusted with respect to other RF signals, all of which pass through one or more RF antenna such that focused RF signals are directed to a target.

"Receiver" refers to a device which may include at least one antenna, at least one rectifying circuit, and at least one power converter for powering or charging an electronic device using RF waves.

"Pocket-forming" refers to generating two or more RF waves which converge in 3-D space, forming controlled constructive and destructive interference patterns.

"Pockets of energy" refers to areas or regions of space where energy or power may accumulate in the form of constructive interference patterns of RF waves.

"wireless power system" refers to one or more wireless power transmitter managers and one or more wireless power receivers that provide wireless power to electronic devices, and also one or more cloud-based back-end servers that perform system management functions.

"wireless power network" refers to one or more wireless power transmitter managers, wireless power receivers, servers, and clouds within a local network or the internet to provide wireless power transfer to electronic devices.

"Wireless power device" refers to a device used in a wireless power network to send, receive, and store information, among others; examples of wireless power devices may include wireless power transmitter manager, wireless power receiver, end user hand-held devices and servers, among others.

"GUI device" refers to a software installed in a client computing device such as a laptop computer, smartphone, or tablet, among others to manage the wireless power network.

"Pairing" refers to the relationship between a wireless power receiver and the graphical user interface (GUI) to which it is physically adjacent.

"Assigned" refers to the relationship between a wireless power receiver and its nearest wireless power transmitter manager.

DESCRIPTION OF THE DRAWINGS

In the following detailed description, reference is made to the accompanying drawings, which form a part hereof. In the drawings, which may not be to scale or to proportion, similar symbols typically identify similar components, unless context dictates otherwise. The illustrative embodiments described in the detailed description, drawings and claims, are not meant to be limiting. Other embodiments may be used and/or and other changes may be made without departing from the spirit or scope of the present disclosure.

FIG. 1 shows a wireless power system 100 using a wireless power transmitter manager 102, according to an embodiment. Wireless power transmitter manager 102 may include a processor with computer-readable medium, such as a random access memory (RAM) (not shown) coupled to the processor. Examples of processor may include a microprocessor, an application specific integrated circuit (ASIC), and field programmable object array (FPOA), among others.

Wireless power transmitter manager 102 may transmit controlled Radio RF waves which may converge in 3-D space to a wireless power receiver 104 for charging or powering a customer device 106. These RF waves may be controlled through phase and/or relative amplitude adjustments to form constructive and destructive interference patterns (pocket-forming). Pockets of energy may form at constructive interference patterns and can be 3-dimensional in shape whereas null-spaces may be generated at destructive interference patterns.

Wireless power receiver 104 may be paired with customer device 106 or may be built into customer device 106. Examples of customer devices 106 may include laptop computer, mobile device, smartphones, tablets, music players, and toys, among other. Customer device 106 may include a graphical user interface 112 (GUI) as part of wireless power system 100 software downloaded and installed from public application store.

Wireless power transmitter manager 102 may receive customer device's signal strength from advertisement emitted by wireless power receiver 104 for the purpose of detecting if wireless power receiver 104 is nearer to wireless power transmitter manager 102 than to any other wireless power transmitter manager 102 in system 100. Graphical user interface 112 (GUI) may receive customer device's signal strength from advertisement emitted by wireless power receiver 104 for the purpose of detecting if wireless power receiver 104 is paired with graphical user interface 112 (GUI).

According to some aspects of this embodiment, wireless power transmitter manager 102 may include a device database 116, where device database 116 may store information about all network devices, such as universally unique identifier (UUID), serial number, signal strength, identification of paired partner device, customer device's power schedules and manual overrides; customer devices past and present operational status, battery level and charge status, hardware value measurements, faults, errors, and significant events; names, customer's authentication or authorization names, and configuration details running the system, among others.

Wireless power transmitter manager 102 may send power in a range up to 30 feet.

Wireless power transmitter manager 102 may use, but is not limited to, Bluetooth low energy (BTLE) to establish a communication link 108 with wireless power receiver 104 and a control link 110 with customer device's graphical user interface (GUI). Wireless power transmitter manager 102 may use control link 110 to receive commands from and receive pairing information from customer device's graphical user interface (GUI).

Wireless power transmitter manager 102 may include antenna manager software 114 to track customer device 106. Antenna manager software 114 may use real time telemetry to read the state of the power received in customer device 106.

Wireless power transmitter manager 102 may create a wireless energy area model which includes information about all the movements in the system. This information may be stored in device database 116.

In other situations, there can be multiple wireless power transmitter managers 102 and/or multiple wireless power receivers 104 for powering multiple and various customer devices 106.

Figure 2:
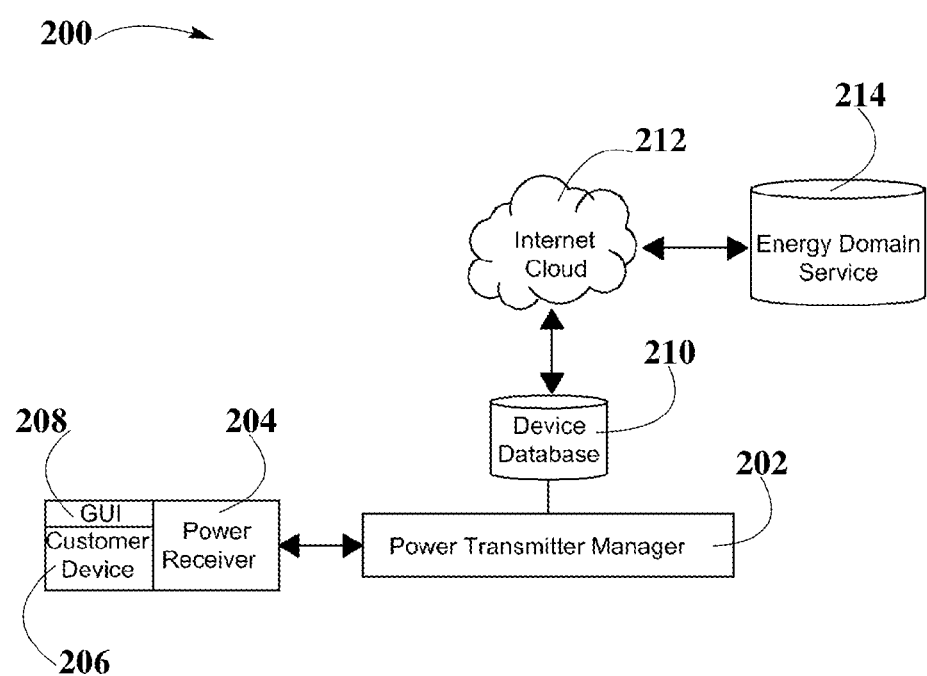
FIG. 2 illustrates a system architecture for smart registration of wireless power receivers within a wireless power network, according to another embodiment.

FIG. 2 illustrates a system architecture for smart registration 200 of wireless power receivers within a wireless power network, according to another embodiment.

In a wireless power network, one or more wireless power transmitter managers and/or one or more wireless power receivers may be used for powering various customer devices.

Each wireless power device in the wireless power network may include a universally unique identifier (UUID). Examples of wireless power devices may include wireless power transmitter manager, wireless power receiver, end user hand-held or mobile devices, and servers, among others.

A wireless power transmitter manager 202 may include a processor with computer-readable medium, such as a random access memory (RAM) (not shown) coupled to the processor. Examples of processor may include a microprocessor, an application specific integrated circuit (ASIC), and a field programmable object array (FPOA), among others.

According to some aspects of this embodiment, each wireless power device bought by a customer may be registered at the time of purchase, or registered later by the customer using public accessible web page or smart device application that communicates to energy domain service 214. The registry may be stored in an energy domain service 214.

Energy domain service 214 may be one or more cloud-based servers and each cloud-based servers may include a database that may store a registry for each wireless power device purchased by a customer. Cloud-based servers may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data. The registry may include customer's name, customer's credit card, Pay Pal account, or any other method of payment, address, and wireless power device UUID, among others. The registry may indicate whether wireless power transmitter manager 202 is for business, commercial, municipal, government, military, or home use. The registry may also include different access policies for each wireless power transmitter manager 202, depending on it use, for example if wireless power transmitter manager 202 will be for businesses use, the customer may need to define whether the power transfer will be charged or not.

In a different aspect of this embodiment, a wireless power receiver 204 may include a nonvolatile memory for storing wireless power transmitter manager 202 universally unique identifier (UUID). Examples of nonvolatile memory may include read-only memory, flash memory, ferroelectric RAM (F-RAM) hard disks, floppy disks, and optical discs, among others. Wireless power receiver 204 may be paired with customer device 206 or may be built into customer device 206. Examples of customer devices 206 may include laptop computer, mobile device, smartphone, tablet, music player, and toys, among other. Customer device 206 may include a graphical user interface 208 (GUI) as part of wireless power system software downloaded and installed from public application store.

According to some aspects of this embodiment, wireless power transmitter manager 202 may include a device database 210, where device database 210 may store information about all network devices such as universally unique identifier (UUID), serial number, signal strength, identification of paired partner device, customer device's power schedules and manual overrides; customer device's past and present operational status, battery level and charge status, hardware value measurements, faults, errors, and significant events; names, customer's authentication or authorization names, and configuration details running the system, among others.

Wireless power transmitter manager 202 may send power in a range up to 30 feet.

According to some aspects of this embodiment, wireless power transmitter manager 202 may detect customer device's signal strength from advertisement emitted graphical user interface 208 (GUI) for the purpose of detecting if wireless power receiver 204 is paired with graphical user interface 208 (GUI). Wireless power transmitter manager 202 may also detect if wireless power receiver 204 is nearer to wireless power transmitter manager 202 than to any other wireless power transmitter manager 202 in the wireless power network through an analysis of each device database records in the wireless power system 100. Each record may include a list of each wireless power receiver 204 and its signal strength relative to and detected by wireless power transmitter manager 202. Then wireless power receiver 204 may be assigned to wireless power transmitter manager 202, which may have exclusive control and authority to change the wireless power receiver's record in distributed system device database 210 until wireless power receiver 204 moves to a new location closer to another wireless power transmitter manager 202. If wireless power receiver 204 change to new location closer to another wireless power transmitter manager 202, then wireless power transmitter manager 202 (with control over wireless power receiver 204) may update wireless power receiver's record with its UUID.

If wireless power receiver 204 tries to charge using wireless power transmitter manager 202, then wireless power transmitter manager 202 may verify with energy domain service 214 if it is authorized to send power to wireless power receiver 204. Therefore wireless power transmitter manager 202 may establish a communication connection with wireless power receiver 204 to request its universally unique identifier (UUID). Wireless power receiver 204 may send UUID to wireless power transmitter manager 202. Wireless power transmitter manager 202 may establish communication connection with energy domain service 214 and then send its UUID and wireless power receiver 204 UUID to energy domain service 214 through an internet cloud 212, where internet cloud 212 may be any suitable connections between computers such as, for example, intranets, local area networks (LAN), virtual private networks (VPN), wide area networks (WAN) and the internet among others. Once energy domain service 214 receives wireless power transmitter UUID and wireless power receiver 204 UUID, it may inspect the registry for wireless power transmitter manager 202 using UUID. Registry may include access policy for wireless power transmitter manager 202. Energy domain service 214 may determine through the access policy whether wireless power transmitter manager 202 needs to pay to receive power. If wireless power transmitter manager 202 access policy states that wireless power receiver 204 with UUID needs to pay to receive power, energy domain service 214 may verify whether a credit card, Pay Pal, or other payment method, may be denoted within wireless power receiver 204 registry. If a payment method is associated with wireless power receiver 204, energy domain service 214 may send a message to wireless power transmitter manager 202 authorizing the power transfer to wireless power receiver 204. Wireless power transmitter manager 202 may report energy consumption statistics to energy domain service 214 for subsequent billing of wireless power receiver's owner. Energy consumption statistics may be stored in device database 210 and also may be sent to energy domain service 214 and saved in wireless power receiver's registry.

If no payment method is associated with wireless power receiver 204, energy domain service 214 may send a message to wireless power transmitter manager 202 denying the power transfer to wireless power receiver 204.

In the case wireless power transmitter manager 202 access policy states that no charge will be applied to certain wireless power receivers 204, then energy domain service 214 may confirm if wireless power receiver 204 is allowed to receive power from wireless power transmitter manager 202. If wireless power receiver 204 is allowed to receive power from wireless power transmitter manager 202, then, energy domain service 214 may send a message to wireless power transmitter manager 202 authorizing the power transfer to wireless power receiver 204. Otherwise energy domain service 214 may send a message to wireless power transmitter manager 202 denying the power transfer to wireless power receiver 204.

According to some aspect of this embodiment, a customer, may be able to select through a GUI device, which wireless power receivers 204 may receive charge from wireless power transmitter manager 202. In the GUI device, customer may be able to visualize each wireless power receiver 204 near wireless power transmitter manager 202, then, customer may select which wireless power receivers 204 are allowed to receive charge from wireless power transmitter manager 202. This information may be stored in device database 210 and also may be sent to energy domain service 214.

In a different aspect of this embodiment, a proprietor or clerk of a commercial or retail business establishment that owns a wireless power system may be able to select through the GUI device a wireless power receiver 204 to receive power from one or more wireless power transmitter managers 202 within power range of wireless power receiver 204. The customer may be provided with a pre-authorized wireless power receiver 204 at business establishment by proprietor or clerk. The wireless power receiver 204 may be attached to customer's device. The proprietor or clerks may specify to GUI device the customer's method of payment (credit card, Pay Pal, cash, among others.). Immediately the wireless power transmitter manager 202 that belong to business establishment may start sending power to the customer device that is attached to pre-authorized wireless power receiver 204. Customer may be billed on behalf of business establishment for power provided. Also in the GUI device, proprietor or clerk may be able to visualize power received by wireless power receiver 204 and the amount to bill for power received. This information may be stored in distributed system device database 210 and also may be sent to energy domain service 214.

Figure 3:
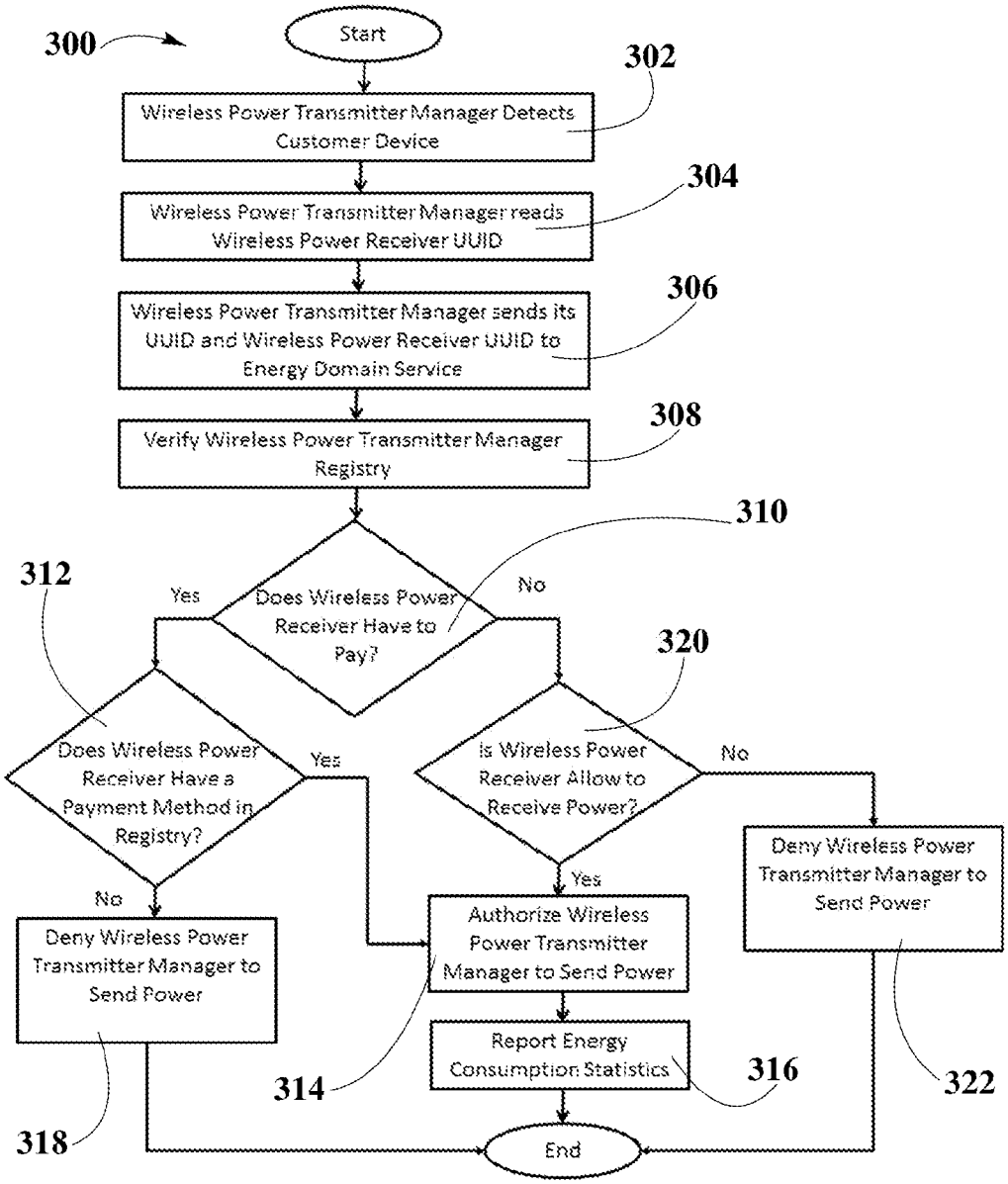
FIG. 3 is a flowchart of a method for smart registration of wireless power receivers within a wireless power network, according to a further embodiment.

FIG. 3 is a flowchart of a method for smart registration 300 of wireless power receivers within a wireless power network, according to a further embodiment.

In a wireless power network, one or more wireless power transmitter managers and/or one or more wireless power receivers may be used for powering various customer devices. Each wireless power device in the wireless power network may include a universally unique identifier (UUID). Examples of wireless power devices may include wireless power transmitter manager, wireless power receiver, end user hand-held or mobile devices and servers, among others.

The method may start at step 302 when a wireless power transmitter manager detects a customer device. Customer device may be paired with wireless power receiver or wireless power receiver may be built in a customer device. Example of customer devices may include smartphones, mobile device, tablets, music players, toys and others at the same time. Customer device may include a graphical user interface (GUI) as part of wireless power system software downloaded and installed from public application store.

Wireless power transmitter manager may detect customer device's signal strength from advertisement emitted graphical user interface (GUI) for the purpose of detecting if wireless power receiver is paired with graphical user interface (GUI). Wireless power transmitter manager may also detect if wireless power receiver is nearer to wireless power transmitter manager than to any other wireless power transmitter manager in the wireless power network through an analysis of each device database records in the wireless power system. Each record may include a list of each wireless power receiver and its signal strength relative to and detected by wireless power transmitter manager. Then wireless power receiver may be assigned to wireless power transmitter manager, which may have exclusive control and authority to change the wireless power receiver's record in distributed system device database until wireless power receiver moves to a new location closer to another wireless power transmitter manager.

According to some aspects of this embodiment, Device database may store information about all network devices such as universally unique identifier (UUID), serial number, signal strength, identification of paired partner device, customer device's power schedules and manual overrides; customer device's past and present operational status, battery level and charge status, hardware value measurements, faults, errors, and significant events; names, customer's authentication or authorization names, and configuration details running the system, among others.

Wireless power transmitter manager may establish a communication connection with wireless power receiver indicating is within range to receive charge. Wireless power transmitter manager may send power in a range up to 30 feet.

If wireless power receiver tries to obtain charge from wireless power transmitter manager, wireless power transmitter manager may verify with energy domain service if it is authorized to send power to wireless power receiver. Therefore wireless power transmitter may establish a communication connection with wireless power receiver to request universally unique identifier (UUID). Wireless power receiver may send UUID to wireless power transmitter manager. Wireless power transmitter manager may read wireless power receiver UUID, at step 304.

Energy domain service may be one or more cloud-based servers and each cloud-based servers may include a database that may store a registry for each wireless power device purchased by a customer. Cloud-based servers may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data. The registry may include customer's name, customer's credit card, address, and wireless power device UUID, among others. The registry may indicate whether wireless power transmitter manager is for business, commercial, municipal, government, military, or home use. The registry may also include different access policies for each wireless power transmitter manager, depending on it use, for example if wireless power transmitter manager will be for businesses use, the customer may need to define whether the power transfer will be charged or not.

According to some aspects of this embodiment, each wireless power device bought by a customer may be registered at the time of purchase, or registered later by the customer using public accessible web page or smart device application that communicates to energy domain service.

Wireless power transmitter manager may send its UUID and also wireless power receiver UUID to an energy domain service through the internet cloud, at step 306. Internet cloud may be any suitable connections between computers such as, for example, intranets, local area networks (LAN), virtual private networks (VPN), wide area networks (WAN) and the internet among others.

Energy domain service may inspect the registry for wireless power transmitter manager using UUID, at step 308. Registry may include access policy for wireless power transmitter manager.

Energy domain service may determine through the access policy whether wireless power transmitter manager needs to pay to receive power, at step 310.

If wireless power transmitter manager access policy states that wireless power receiver with UUID needs to pay to receive power, energy domain service may verify whether a credit card, Pay Pal, or other payment method, may be denoted within wireless power receiver registry, at step 312.

If a payment method is associated with wireless power receiver registry, energy domain service may send a message to wireless power transmitter manager authorizing the power transfer to wireless power receiver, at step 314.

Wireless power transmitter manager may report energy consumption statistics to energy domain service for subsequent billing of wireless power receiver's owner, at step 316. Energy consumption statistics may be stored in device database and also may be sent to energy domain service and saved in wireless power receiver's registry.

In the case no payment method is associated with wireless power receiver, energy domain service may send a message to wireless power transmitter manager denying the power transfer to wireless power receiver, at step 318.

Else, if wireless power transmitter manager access policy states that no charge will be applied to a certain wireless power receiver which may be trying to obtain power from wireless power transmitter manager, energy domain service may confirm whether wireless power receiver is allowed to receive power from wireless power transmitter manager, at step 320.

If wireless power receiver is allowed to receive power from wireless power transmitter manager. Energy domain service may send a message to wireless power transmitter manager authorizing the power transfer to wireless power receiver, at step 314.

Wireless power transmitter manager may report energy consumption statistics to energy domain service, at step 316. Energy consumption statistics may be stored in device database and also may be sent to energy domain service and saved in wireless power receiver's registry.

Otherwise if wireless power receiver is not allowed to receive power from wireless power transmitter manager, energy domain service may send a message to wireless power transmitter manager denying the power transfer to wireless power receiver, at step 322

According to some aspect of this embodiment, a customer may be able to select through a GUI device which wireless power receivers may receive charge from wireless power transmitter manager. In the GUI device, customer may be able to visualize each wireless power receiver near to wireless power transmitter manager, then customer may select which wireless power receivers are allowed to receive charge from wireless power transmitter manager. This information may be stored in device database and also may be sent to energy domain service.

Examples

Example #1 is a wireless power network with components similar to those described in FIG. 2. A customer may have a wireless power transmitter manager in his/her house. The customer invites three friends to watch a football game. Two of the three friends have a wireless power receiver cover paired with their cellphones. When both wireless power receivers are within the range of the wireless power transmitter manager, they may receive a message from wireless power transmitter manager indicating they are within range to receive power. One of the wireless power receivers may try to obtain power from wireless power transmitter manager, but first the wireless power transmitter manager may verify whether wireless power receiver is authorized to receive power. Therefore wireless power transmitter manager may send its own UUID and wireless power receiver UUID to an energy domain service. Energy domain service may verify access policy for wireless power transmitter manager to determine if a billing charge has to be applied for using wireless power transmitter manager. The access policy for wireless power transmitter manager may indicate that no charge will be applied for using wireless power transmitter manager and that any wireless power receiver is able to receive charge from it. Energy domain service may verify wireless power receiver registry and then energy domain service may authorize wireless power transmitter manager to send power to wireless power receiver.

Example #2 is a wireless power network with components similar to those described in FIG. 2. A restaurant may have a wireless power transmitter manager. A customer within the restaurant has a cellphone with a wireless power receiver cover. The customer may want to charge his/her cellphone while having dinner. The customer tries to charge his/her cellphone using wireless power transmitter manager, the wireless power transmitter manager may need to verify if wireless power receiver is authorized to receive power. Therefore wireless power transmitter manager may send its own UUID and wireless power receiver UUID to an energy domain service. Energy domain service may verify access policy for wireless power transmitter manager to determine if a billing charge has to be applied for using wireless power transmitter manager. The access policy for wireless power transmitter manager may indicate that a charge will be applied for using wireless power transmitter manager. Then, energy domain service may verify wireless power register to determine whether a method of payment such as credit card or other method is associated with wireless power receiver. If a payment method is on the registry file, energy domain service may authorize wireless power transmitter manager to send power to wireless power receiver. Wireless power transmitter manager may track the amount of power sent to wireless power receiver. This information may be stored in device database and also may be sent to energy domain service to generate a bill, on behalf of the restaurant.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

The invention claimed is:

1. A wireless power system configured to provide pocket-forming energy in three-dimensional space, the system comprising:
a plurality of wireless power transmitters, each wireless power transmitter comprising:
a power transmitter manager comprising an antenna manager; and
a storage comprising a device database, wherein the storage is operatively coupled to the power transmitter manager,
wherein a wireless power transmitter of the plurality of wireless power transmitters is configured to receive authorization data from a device, and to determine an authorization state for the device based at least in part on the received authorization data, and
wherein the wireless power transmitter is configured to control generation of pocket-forming power waves in three-dimensional space via the antenna manager based on the authorization state, and
wherein the wireless power transmitter transmits and controls the power waves upon determining that the wireless power transmitter is receiving the strongest signal from the device according to a database record associated with the device and stored in a device database, wherein the database record indicates one or more signal strengths received from the device by one or more respective wireless power transmitters.

2. The wireless power system of claim 1, wherein the authorization data comprises at least one of a device identification, a customer name associated with the device, a payment mechanism for a customer associated with the device, and an access policy for the customer associated with the device.

3. The wireless power system of claim 1, wherein the device database comprises at least one of device network identification data, device serial number data, device signal strength data, paired device data, device power schedule data, device operational status, device battery level data, device charge status data, device hardware value measurement data, device fault data, device error data, device authorization data, and device system configuration data.

4. The wireless power system of claim 1, wherein the power transmitter manager is configured to communicate with an energy domain service.

5. The wireless power system of claim 4, wherein the power transmitter manager is configured to receive registry data from the energy domain service, wherein the registry data comprises at least one of a device identification, a customer name associated with the device, a payment mechanism for a customer associated with the device, and an access policy for the customer associated with the device.

6. The wireless power system of claim 4, wherein the power transmitter manager is configured to determine the authorization state via communication with the energy domain service.

7. The wireless power system of claim 1, wherein the power transmitter manager is configured to track an amount of pocket-forming energy generated after the authorization state is determined.

8. A method for operating a wireless power system configured to provide pocket-forming energy in three-dimensional space, the method comprising:
receiving, by a power transmitter manager of a wireless power transmitter of a plurality of wireless power transmitters, authorization data for a device;
determining, by the wireless power transmitter, an authorization state for the device based at least in part on the received authorization data; and
controlling, by the wireless power transmitter, generation by an antenna manager of the transmitter of pocket-forming energy in three-dimensional space, based upon the authorization state, and upon determining by the wireless power transmitter that the wireless power transmitter is receiving the strongest signal from the device according to a database record associated with the device and stored in a device database, wherein the database record indicates one or more signal strengths received from the device by one or more respective wireless power transmitters.

9. The method of claim 8, wherein the authorization data comprises at least one of a device identification, a customer name associated with the device, a payment mechanism for a customer associated with the device, and an access policy for the customer associated with the device.

10. The method of claim 8, further comprising:
storing, in the device database, at least one of device network identification data, device serial number data, device signal strength data, paired device data, device power schedule data, device operational status, device battery level data, device charge status data, device hardware value measurement data, device fault data, device error data, device authorization data, and device system configuration data,
wherein the device database is associated with the power transmitter manager, and the authorization state is determined at least in part from the data stored in the device database.

11. The method of claim 8, further comprising the step of communicating data between the power transmitter manager and an energy domain service.

12. The method of claim 11, further comprising the step of receiving, in the power transmitter manager of the wireless power transmitter, registry data from the energy domain service, wherein the registry data comprises at least one of a device identification, a customer name associated with the device, a payment mechanism for a customer associated with the device, and an access policy for the customer associated with the device.

13. The method of claim 12, wherein the authorization state is determined at least in part from the registry data.

14. The method of claim 8, further comprising the step of tracking, in the power transmitter manager of the transmitter, an amount of pocket-forming energy generated after the authorization state is determined.

15. A method for operating a wireless power system configured to provide pocket-forming energy in three-dimensional space, the method comprising:
establishing, by a wireless power transmitter, a communications link with a device via a power transmitter manager;
receiving, by the wireless power transmitter, authorization data for the device via the communications link;
determining, by the wireless power transmitter, an authorization state for the device based at least in part on the received authorization data; and controlling, by the wireless power transmitter, generation of pocket-forming energy in three-dimensional space via the power transmitter manager based upon the authorization state and upon determining by the wireless power transmitter that the wireless power transmitter is receiving the strongest signal from the device according to a database record associated with the device and stored in a device database, wherein the database record indicates one or more signal strengths received from the device by one or more respective wireless power transmitters.

16. The method of claim 15, wherein the authorization data comprises at least one of a device identification, a customer name associated with the device, a payment mechanism for a customer associated with the device, and an access policy for the customer associated with the device.

17. The method of claim 15, further comprising the step of
storing, in the device database, at least one of device network identification data, device serial number data, device signal strength data, paired device data, device power schedule data, device operational status, device battery level data, device charge status data, device hardware value measurement data, device fault data, device error data, device authorization data, and device system configuration data,
wherein the device database is associated with the power transmitter manager, and wherein the authorization state is determined at least in part from the data stored in the device database.

18. The method of claim 15, further comprising the step of communicating data between the power transmitter manager and an energy domain service.

19. The method of claim 18, further comprising the step of receiving,
in the wireless power transmitter, registry data from the energy domain service in the power transmitter manager, wherein the registry data comprises at least one of a device identification, a customer name associated with the device, a payment mechanism for a customer associated with the device, and an access policy for the customer associated with the device.

20. The method of claim 19, wherein the authorization state is determined at least in part from the registry data.

* * * * *